United States Patent
Sjöberg

(10) Patent No.: US 8,046,104 B2
(45) Date of Patent: Oct. 25, 2011

(54) INDUSTRIAL ROBOT SYSTEM

(75) Inventor: Ralph Sjöberg, Västerås (SE)

(73) Assignee: ABB AB, Västerås (SE)

( * ) Notice: Subject to any disclaimer, the term of this patent is extended or adjusted under 35 U.S.C. 154(b) by 1208 days.

(21) Appl. No.: 11/667,067

(22) PCT Filed: Oct. 21, 2005

(86) PCT No.: PCT/SE2005/001577
§ 371 (c)(1),
(2), (4) Date: May 4, 2007

(87) PCT Pub. No.: WO2006/049554
PCT Pub. Date: May 11, 2006

(65) Prior Publication Data
US 2008/0125908 A1    May 29, 2008

Related U.S. Application Data

(60) Provisional application No. 60/625,285, filed on Nov. 4, 2004.

(30) Foreign Application Priority Data

Nov. 4, 2004    (SE) .................................... 0402696-9

(51) Int. Cl.
G06F 21/00    (2006.01)
(52) U.S. Cl. ........................................ 700/264; 318/569
(58) Field of Classification Search .................. 700/264, 700/245, 260, 250, 255, 1, 2, 17, 19, 20, 700/28, 40, 83, 248, 249; 340/10.1, 10.51, 340/10.52, 10.5, 10.42, 5.5, 5.51, 5.6; 318/568.11, 318/568.25, 568.12, 568.2, 567, 569; 901/3–4, 901/6, 8, 9, 46
See application file for complete search history.

(56) References Cited

U.S. PATENT DOCUMENTS 4,672,280 A * 6/1987 Honjo ............................ 318/587
(Continued)

FOREIGN PATENT DOCUMENTS

DE    19536293 A1    1/1997
(Continued)

OTHER PUBLICATIONS

PCT/ISA/210—International Search Report—Jan. 11, 2006.
(Continued)

*Primary Examiner* — Dalena Tran
(74) *Attorney, Agent, or Firm* — Venable LLP; Eric J. Franklin

(57) ABSTRACT

An industrial robot system including at least one industrial robot including a manipulator and a control unit for controlling the manipulator, a portable operator control device for teaching and manually operating a robot. The portable operator control device includes safety equipment including an enabling device, which upon activation enables manual operation of the robot by the portable operator control device. The portable operator control device is adapted for wireless communication with the control unit, and a detecting unit that detects when the portable operator control device enters an area defined in the vicinity of the manipulator. The robot includes an enabling function which upon activation enables the enabling device of the portable operator control device, and upon deactivation disables the enabling device. The robot system is adapted to automatically activate the enabling function of the robot upon detecting that the portable operator control device enters the defined area.

31 Claims, 5 Drawing Sheets

U.S. PATENT DOCUMENTS

| | | | |
|---|---|---|---|
| 4,697,979 A | 10/1987 | Nakashima et al. | |
| 4,888,708 A | 12/1989 | Brantmark et al. | |
| 6,697,681 B1 * | 2/2004 | Stoddard et al. | 700/17 |
| 6,717,382 B2 * | 4/2004 | Graiger et al. | 318/587 |
| 2001/0035729 A1 | 11/2001 | Graiger et al. | |
| 2004/0148058 A1 | 7/2004 | Johannessen et al. | |
| 2005/0052148 A1 | 3/2005 | Carlson et al. | |
| 2005/0060064 A1 | 3/2005 | Valen et al. | |
| 2005/0137746 A1 | 6/2005 | Carlson et al. | |

FOREIGN PATENT DOCUMENTS

WO     WO 02/078913 A     10/2002

OTHER PUBLICATIONS

PCT/ISA/237—Written Opinion of the International Searching Authority—Jan. 11, 2006.

European Search Report—Nov. 24, 2008.

\* cited by examiner

INDUSTRIAL ROBOT SYSTEM

CROSS-REFERENCE TO RELATED APPLICATIONS

This application claims priority to U.S. provisional patent application 60/625,285 filed 4 Nov. 2004 and Swedish patent application number 0402696-9 filed 4 Nov. 2004 and is the national phase under 35 U.S.C. §371 of PCT/SE2005/001577 filed 21 Oct. 2005.

FIELD OF THE INVENTION

The present invention relates to an industrial robot system including at least one industrial robot comprising one or more manipulators, and a control unit for controlling the manipulators, and a portable operator control device, which comprises safety equipment including an enabling function comprising an enabling device, which upon activation enables manual operation of the robot by means of the TPU. The invention also relates to a method for coupling the TPU to the industrial robot. A manipulator is a mechanical unit movable about at least on axis. A manipulator could be a conveyer belt as well as a 6-axis robot.

PRIOR ART

An industrial robot is programmed to carry out work along an operating path. In order to program or teach the robot the work, the robot is manipulated to positions along the desired operating path. These positions are stored as instructions in a memory in the control unit. Other information, such as desired robot movement velocity, may also be stored in the memory. During operation of the robot, the program instructions are executed, thereby making the robot operate as desired.

The person controlling a robot is denoted an operator. In the following the words user and operator are used synonymously. An industrial robot can be operated in different operation modes. For example, when the robot is put in manual operation mode, the robot is controlled be means of a portable operator control device, generally denoted a Teach Pendant Unit, and called hereafter a TPU. The TPU is used for manually controlling the robot, for example to teach or program the robot to follow an operating path. The TPU may also be used for monitoring the robot program, changing certain variables in the program, starting, stopping and editing the program.

A TPU normally comprises operator control means, for example a joystick, a ball, a set of buttons or any combination thereof, a visual display unit, and safety equipment such as an enabling device and an emergency stop button or a stop button. Normally, the enabling device is for example a switch or a push button, which has to be pressed by the operator to enable control of the robot by the TPU. The enabling device affects the current to the motors of the robot. When the enabling device is released it is not possible to operate the robot by means of the TPU. For safety reasons the TPU normally is provided with either an emergency stop button, which makes it possible for the operator to unconditionally stop the robot at any time by pushing the button, or a stop button, which makes it possible for the operator to conditionally stop the robot.

In order to facilitate the automation of complex series of actions under safe conditions, the robots can be placed into robot cells. Due to the considerable risk for twisting the cables, it is particularly advantageous to use a wireless TPU when there are several robots arranged near each other in a robot line. From the German patent No. DE 195 36 293 it is known to use a wireless link for exchange of information between the TPU and the robot. One advantage with a wireless connection between the robot and the TPU is the possibility of using the same TPU for several robots. Then, the TPU does not belong to a certain robot, and can be used together with any of the robots in the robot cell.

The first thing to be done, when a TPU is to be used for controlling a robot is to establish a communication link between the robot control system and the TPU. Generally, if there is more than one robot in a robot cell they are connected to each other via a common network so that the robots can communicate with each other. Then, to establish a communication link between the robot and the TPU, the TPU must be connected to the common network. The international patent application WO03036324 discloses an industrial robot system comprising industrial robots being controlled by a wireless TPU. The TPU communicates with the robot control system via a data link. The document discloses that one or more areas are defined within which the TPU is allowed to, under secure condition, establish communication with the control system via the data link. When a TPU is moved away from the robot and reaches outside the defined area, the system is programmed to automatically break the data link between the control unit and the TPU. The data link is also broken when the TPU passes the boarder into a neighboring area of another robot. The data link is established again when the TPU is back again within the defined area. The position of the TPU is measured, and the data link between the TPU and the robot is established and broken due to the position of the TPU.

To avoid accidents and unintended emergency stops of the robot, the enabling device and the safety button should be out of function as long as the wireless TPU is not coupled to any specific robot. When the TPU has been connected to the network and communication have been established between the TPU and the control systems of the robots, the operator may select one of the robots for manual control by the TPU. To be able to control a specific robot with the TPU, the TPU has to be coupled to the robot. To couple the TPU to the robot includes connect the TPU to the safety system of the robot, and login the operator to the control system of the robot. To connect the TPU to the safety system of the robot includes activating the enabling function of the robot, which means to put the enabling device of the TPU into function for the selected robot. Thus, when the enabling function is activated, the enabling device of the TPU functions and it is possible to move the selected robot, for example by means of the joystick, when the enabling button of the TPU is pressed. When the enabling function is deactivated, it is not possible to move the robot with the TPU, even with the enabling button pressed. Before connecting the TPU to the safety system, the safety equipment has to be checked and found faultless.

When one of the robots in a robot cell is to be placed under manual control using a wireless TPU, it is important that the TPU is controlling the correct robot. Otherwise, there is a risk for personal injury, should the operator believe that he is operating a certain robot but is instead operating another robot in the cell. To ensure that the correct robot is coupled to the TPU, it has been proposed in the international patent application WO02/078914 to have a movable key device carrying information about the identity of the robot. The TPU is provided with means for receiving the movable key device and to read the robot identity from the key device.

By physically moving the key device to the TPU, and transferring the robot identification to the TPU, it is possible to ensure that the TPU knows which robot it shall be coupled to. When the robot shall no longer be operated by the TPU, the key device is returned to the robot. The key device may also function as a switch between automatic and manual mode of operation of the robot. In manual mode the enabling function is activated and it is possible to move the robot with the control devices of the TPU, i.e. to manually jog the robot by means of the TPU, and in automatic mode the enabling function is deactivated and it is not possible manually jog the robot by means of the TPU. However, there are some drawbacks with this solution, for example the operator may find it troublesome to move the key device between the robot and the TPU, or the key device may be lost.

When the operator has moved the key device to the TPU, he may begin to couple the TPU to the robot in the usual way known in the art, including log in to the control system by feeding information about the authorization of the operator (identity and safety code) to the system. The control system performs an authorization check based on the authorization information, and if the operator is authorized the TPU is connected to the control system of the robot.

When the operator desires to control one of the other robots, he first has to logout from the control system of the first robot by sending a logout order from the TPU to the control system, and then to login to the control system of the next robot to be controlled by the TPU. Thus, a problem in connection with using the same TPU for controlling more than one robot is that it is time-consuming and troublesome for the operator to change between the robots to be controlled by the TPU.

OBJECTS AND SUMMARY OF THE INVENTION

The object of the present invention is to provide an improved solution to the problem regarding how to couple a wireless TPU to a specific robot. More specifically, the object of the present invention is to provide a solution, which is advantageous to use when the same TPU is used for controlling more than one robot.

According to one aspect of the invention this object is achieved by an industrial robot system.

According to another aspect of the invention this object is achieved by the method for controlling an industrial robot system.

According to one aspect of the invention this object is achieved by an industrial robot system.

According to another aspect of the invention this object is achieved by the method for controlling an industrial robot system.

According to a further aspect of the invention, the object is achieved by a computer program directly loadable into the internal memory of a computer or a processor, comprising software code portions for performing the steps of the method according to the invention, when said program is run on a computer. The computer program is provided either on a computer readable medium or through a network, such as the Internet.

According to another aspect of the invention, the object is achieved by a computer readable medium having a program recorded thereon, when the program is to make a computer perform the steps of the method according to the invention, and said program is run on the computer.

Thanks to the fact that the system automatically activates the enabling function of the robot when the TPU enters an area defined in the vicinity of the manipulator, there is no need for the operator to manually perform any action for activating the enabling function. Thus, the system according to the invention is easy to use and time saving for the operator.

According to an embodiment of the invention the control system of the robot comprises an enabling circuit and the robot system is adapted to activate the enabling circuit of the robot upon detecting that the TPU enters said defined area.

According to an embodiment of the invention the system is adapted to verify whether one or more conditions are fulfilled, and provided that said condition or conditions are fulfilled automatically activate the enabling function of the TPU upon detecting that the TPU enters said defined area. For example one of said conditions is that a check of the safety equipment has been carried out and no errors were found, and another conditions is that the operator must be authorized to use the robot. This embodiment improves the safety of the system for example by ensuring that the enabling function of the robot is not activated if the safety equipment is not functioning, or if the operator is not authorized to control the robot.

According to an embodiment of the invention the system comprises a safety check module adapted to provide an automatic check of the safety equipment upon activation. The safety equipment comprises an enabling device, which enables the operator to control the motion of the robot upon activation. The safety equipment may also comprise an emergency stop button or a stop button, which executes an emergency stop or a stop upon activation. The automatic safety check could for example be run automatically upon detecting that the TPU enters said defined area. Alternatively, the safety check could be run when the TPU enters the robot cell or any other defined place. The operator could also initiate the automatic safety check. Thanks to the fact that the system automatically runs a check module providing a check of the safety equipment there is no need for the operator to manually perform any tests of the safety equipment. Thus, the procedure for coupling the TPU to the robot becomes faster and easier for the operator.

According to an embodiment of the invention the system comprises measuring equipment carrying out measurements on the safety equipment, and said safety check module is adapted for receiving the measurements and on bases thereof detecting errors in the safety equipment. The safety check module is adapted to provide an error message to the operator upon detecting an error in the safety equipment during the safety check. The safety check is automatically performed by means of the measuring equipment and a software module, which is run when it has been detected that the operator has entered the defined area of the robot.

According to an embodiment of the invention the detecting unit comprises means for determining the position of the TPU, and the detecting unit is detecting when the TPU enters said area based on the position of the TPU. When knowing the position of the TPU, it is easy to detect when the operator enters the defined area.

According to an embodiment of the invention the system comprises a login module providing a procedure to login the TPU to the control system of the robot, and the login module is adapted to be run automatically upon detecting that the TPU has entered said defined area. In the prior art the login procedure in initiated and performed by the operator According to this embodiment the login procedure is automatically initiated when the operator comes close enough to the robot. Thus, the login procedure become easier and faster for the operator.

According to an embodiment of the invention the login module comprises means for providing a message informing the user of which control system he is about to be logged in to. Thus, the risk for logging in to the wrong robot is reduced.

According to an embodiment of the invention the entire login procedure is performed automatically without requiring any actions done by the operator. According to another embodiment of the invention said login module is adapted for receiving an approval or a non-approval from the user in response to said message, and said login module is adapted to continue the login procedure upon receiving an approval from the user and to interrupt the login procedure upon receiving a non-approval from the user. In this embodiment the system requires an approval of the operator before continuing with the login procedure. Thus, the risk for logging in to the wrong robot is further reduced.

According to an embodiment of the invention the system comprises storage means adapted for storing information of the authorization of the present user in advance, and said login module comprises means for checking whether the user is authorized to login to the control system, based on the stored information about the authorization of the user. According to this embodiment, the operator only has to send information about his authorization when he first picks up the TPU. This information is then stored until it is needed for the login procedure of the robots. The operator does not have to input information about his identity and security code each time the TPU is logged in to a new robot. Thus, the login procedure becomes faster and easier for the operator.

According to an embodiment of the invention the industrial robot system comprises more than one industrial robot, each robot having an area defined in the vicinity of the robot, said detecting unit is adapted to detect when the TPU enters and leaves any of said defined areas, and said login module is adapted to upon detecting that the TPU enters any of said defined areas, automatically login the TPU to the control system of the robot having the area entered by the TPU. This embodiment reduces the time required for changing between the robots being controlled by the same TPU, and it particularly advantageous when one operator works with several robots. To avoid that the operator by mistake enters the area of another robot than the one he intends to control, and thereby activates the enabling function of the wrong robot, the manipulator preferably is located within the defined area.

According to an embodiment of the invention the detecting unit is adapted to detect when the TPU leaves said defined area, and that the system is adapted to upon detecting that the TPU leaves said defined areas, automatically deactivate the enabling function of the robot. Thus, the procedure for disconnecting the TPU from the robot becomes faster and easier for the operator According to an embodiment of the invention the system comprises a logout module providing a procedure to logout the TPU from the control system, the detecting unit is detecting when the TPU leaves the defined area, and the logout module is adapted to be run automatically upon detecting that the TPU leaves said defined area. According to the prior art the operator initiates the logout procedure. According to this embodiment of the invention, the logout procedure is automatically initiated and performed when the operator goes away from the robot. Thus, both the login and logout from the robot controller is performed automatically based on the position of the TPU. It will no longer be time-consuming and troublesome for the operator to change between the robots to be controlled by the TPU.

The invention is particularly useful for a robot cell or line comprising more than one robot.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
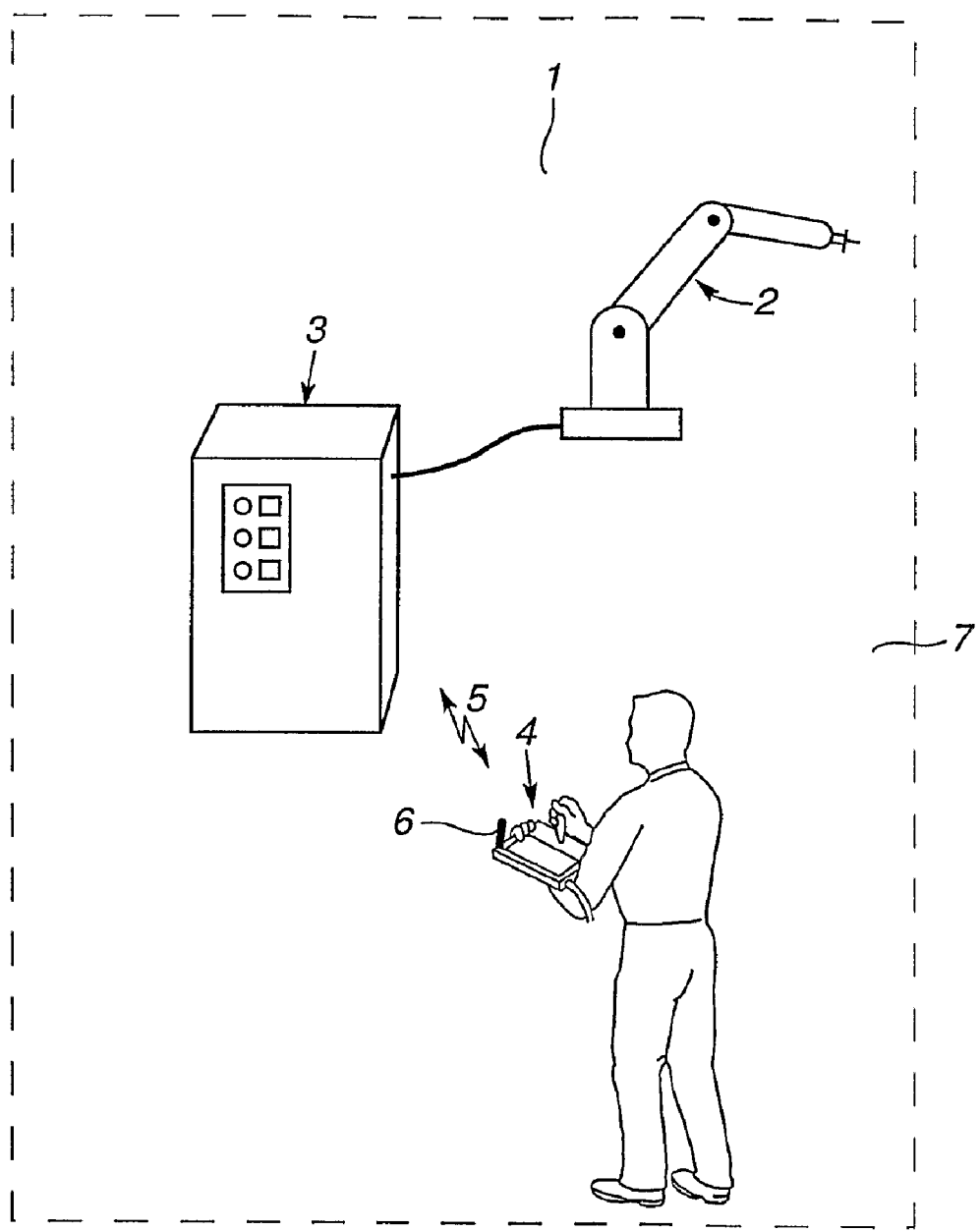
FIG. 1 shows an industrial robot system according to an embodiment of the invention.

FIG. 1 shows an industrial robot system comprising an industrial robot 1, including the manipulator 2, a control unit 3 for controlling the manipulator, and a portable operator control device 4, in the following denoted a TPU (Teach Pendant Unit) for teaching and manually operating the manipulator. The TPU is communicating with the control unit 3 via a wireless data link 5.

Figure 2:
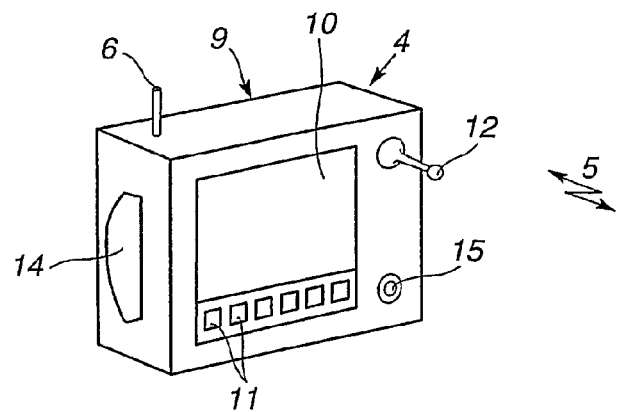
FIG. 2 shows an example of a TPU.

FIG. 2 shows the TPU in more detail. The TPU comprises a portable box 9 including a display screen 10, function keys 11, a joystick 12, an enabling device 14 and an emergency stop device 15. The TPU also includes and antenna 6 for wireless communication with the control unit 3. The function keys 11 permit the operator to select various states for the control system. The joystick 12 is used for controlling the movement of the manipulator when the robot is manually operated. The enabling device 14 comprises a button, which has to be pressed down by the operator to enable control of the robot by the TPU. When the operator releases the button of the enabling device 14, the robot can no longer be operated by the TPU. The emergency stop button causes an emergency stop upon activation. The enabling device 14 and the emergency stop device 15 is a part of the safety equipment of the TPU.

The manipulator 2 is located within an area 7 defined in the vicinity of the robot. According to the invention a safety check of the safety equipment of the TPU is performed automatically when the operator enters the area 7. The area 7 could have any shape, for instance a square or a circular shape. The area 7 is for example defined as the working range of the robot.

The industrial robot system according to the invention comprises a detecting unit, detecting when the TPU enters the area 7. According to one embodiment of the invention the detecting unit comprises means for determining the position of the TPU, and the detecting unit is detecting when the TPU enters the area 7 based on the position of the TPU. The position determining means could be based on any known technology for determining the position of an object, such as accelerometers, magnetic trackers, ultra sound, laser technology, inertial navigation (using accelerometers and gyros), optical systems and the global positioning system (GPS).

Figure 3:
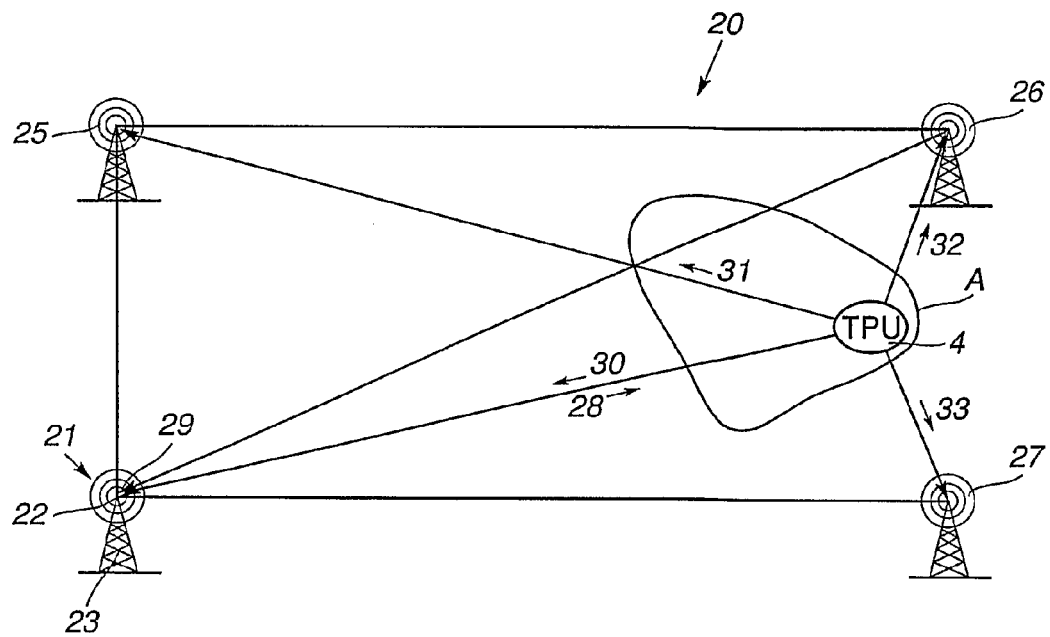
FIG. 3 shows an example of a positioning determining means.

FIG. 3 shows an example of a positioning determining means 20 suitable for determining the position of the TPU. The positioning determining means 20 comprises a reference station 21 including a first radio tower 22 and means for measuring the time 23. Another three radio towers 25, 26 and 27 are arranged at a distance from each other and from the reference station 21. Each radio tower 22, 25, 26 and 27, respectively, comprises a signal receiving means. A signal 28 is sent to the TPU 4 from a transmittal 29 arranged in the reference station 21. The time measuring means 23 is measuring a time interval staring when the signal 28 is sent to the TPU and ending when the respective receiving means receive a retransmitted reply signal 30, 31, 32 and 33 respectively from the TPU. The position of the TPU is calculated on the basis of known parameters for the positions of the four radio towers and the speed of the signal propagation, in combination with the measured time intervals. The time measuring means are synchronized.

In another embodiment the positioning determining means is arranged to measure angles or directions. Two reference stations, provided with receiving means are sending signals to the TPU and receiving the transmitted reply signal from the TPU. The position of the TPU is then obtained by triangulation. In another embodiment the positioning determining means is arranged to measure distance. Two reference stations are sending signals to the TPU and are further provided for determining their respective distance to the TPU. The position of the TPU is determined on the basis of the measured distances and a calculated intersection point.

In an alternative embodiment, the detecting unit comprises means that are activated by the operator when he enters or leaves the area 7. For example the TPU is provided with an activation button. In this embodiment the boarder of the area is marked for example with a visible stripe on the floor, and when the operator crosses the strip he activates the activation button on the TPU, and a signal is send to the system informing it about that the TPU has entered the area.

In an alternative embodiment of the invention the position detecting means comprises electro magnetic rails in the floor, to mark out the border of the defined area, and the TPU comprises means for detecting the rails and thus detecting when it enters or leaves the defined area.

Figure 4A:
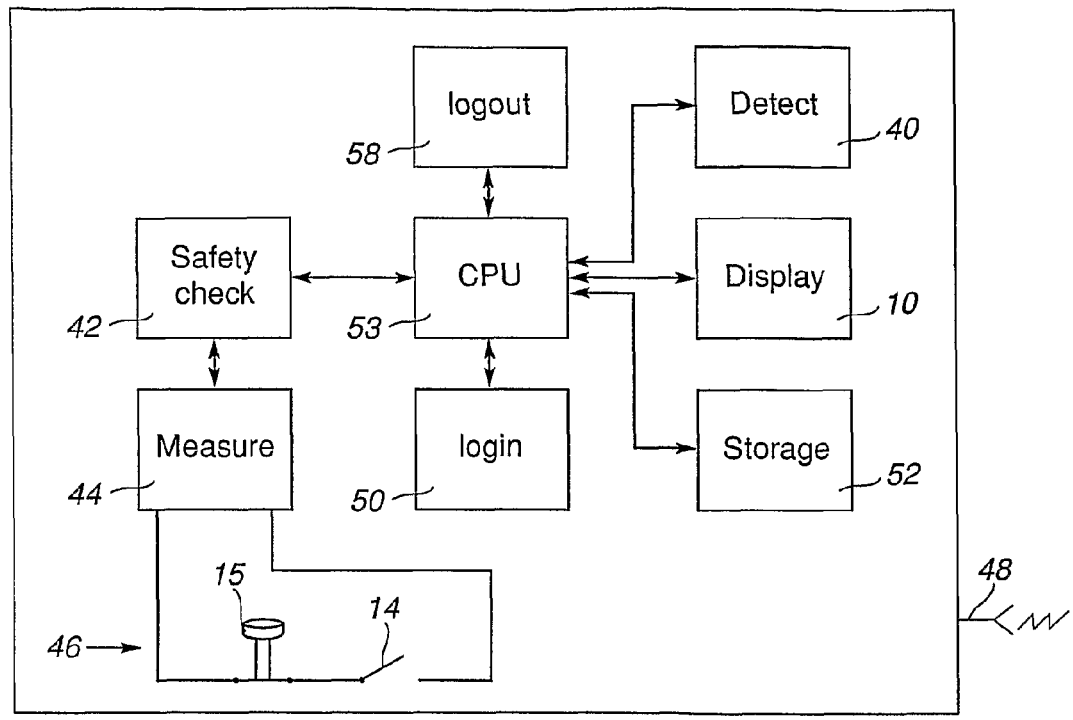
FIG. 4a shows a block diagram of a TPU according to an embodiment of the invention.

FIG. 4a shows by means of a block diagram a TPU according to an embodiment of the invention. The TPU comprises a detecting unit 40, detecting when the TPU enters the area 7. The detecting unit 40 receives the position of the TPU from a detecting means and detects when the TPU enters and leaves the area 7 based on the position of the TPU. The TPU further comprises a safety check module 42 providing a check of the safety equipment. The safety check module 42 is adapted to be run automatically upon detecting that the TPU enters the defined area 7. The TPU also comprises measuring equipment 44 carrying out measurements on the safety equipment. The safety equipment includes a safety circuit 46 comprising the emergency stop button 15 and the enabling device 14, which both are switches. The safety circuit 46 is closed when the enabling device 14 is activated and the stop button 15 is not activated. The measuring equipment 44 is adapted to measure whether or not the safety circuit 46 is functioning.

The safety check module 42 receives the measurements, and on basis thereof detects errors in the safety equipment 46. The safety check module 42 is providing an error message to the operator upon detecting any error in the safety equipment during the safety check. The message is for example displayed on the display screen 10, or is provided with any audible or tactile means. The TPU further comprises an antenna 48 adapted for sending and receiving signals from the control system. If the safety check module 42 does not detect any error in the safety equipment a signal is sent to the control system via the antenna 48.

The TPU further comprises a login module 50, providing a procedure to login the TPU to the control system of the robot. The login module is adapted to be run automatically upon detecting that the TPU has entered the defined area 7. Before logging the TPU into the control system, the login module 50 is providing a message informing the operator of which control system he is about to be logged in to. The login module 50 receives an approval or a non-approval from the user in response to the message. The login module 50 continues the login procedure upon receiving an approval from the user, or interrupts the login procedure upon receiving non-approval from the user. During the login procedure the TPU is communicating with the control system. Preferably at least a part of the login procedure is carried out by the control system, and thus at least a part of the login module 50 is located in the control system. The login module 50 is checking whether the user is authorized to login to the control system, or not based on the stored information about the authorization of the user.

The TPU comprises a storage means 52. The storage means 52 is for example adapted for storing information of the authorization of the present user and for storing the software of the TPU. The TPU further comprises a central processing unit 53 for executing the software modules of the invention.

Figure 4B:
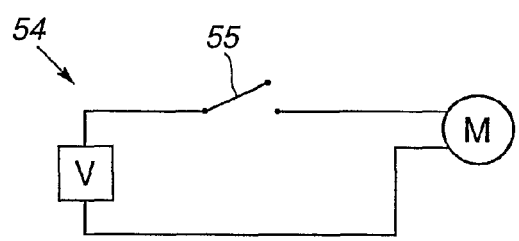
FIG. 4b shows an example of an enabling circuit.

The control system of the robot comprises one enabling circuit, also called an enabling chain. An example of an enabling circuit of the control system is shown in FIG. 4b. The enabling circuit 54 comprises a switch 55 that is opened or closed in dependence of the state of the enabling device. The enabling circuit 54 is connected to the motors M of the robot. When the enabling circuit is broken the brakes are applied to the motors and the robot no longer controls the motors. The enabling circuit has to be activated before the operator is allowed to operate the robot by the TPU. The enabling circuit is activated when a plurality of conditions, which has to be fulfilled to allow safe operation of the robot, are fulfilled. Those conditions are for example that the safety equipment has been tested and no errors was found, that the operator is authorized to use the robot, that the stop button is not activated, and that manual mode is selected.

The control system receives signals from the TPU, informing it about that the safety equipment works and that the emergency stop button 15 is not activated, that the authorization check of the operator has been successful. The enabling circuit is activated when those conditions are fulfilled, and upon detecting that the TPU enters the defined area of the robot. Activation of the enabling circuit means that the enabling function is activated and that manual operation of the robot is enabled. Accordingly, when the enabling circuit is activated the enabling device is operatable. When the operator activates the enabling device of the TPU an enabling signal is sent to the control system, and if the enabling circuit has been activated, the enabling circuit is closed upon receiving the enabling signal and thereby it is possible to operate the robot by means the TPU. Checking whether or not the conditions are fulfilled, and activation and deactivation of the enabling circuit is made by software in the control system.

The TPU further comprises a logout module 58 providing a procedure to logout the TPU from the control system. The logout module is run automatically upon detecting that the TPU leaves the defined area 7. The logout module sends a signal to the control system, which deactivates the enabling function.

The measuring equipment 44 is preferably located in the TPU, but it may also be located in the control system. According to further embodiments of the invention, the software modules 40, 42, 50, 58 could either be implemented in the TPU, or in the control system of the robot. The software modules could also be implemented in an external computer. An advantage with having the software modules in the TPU is that it is easier to implement them. Advantages with having the software modules in the robot control system are that it is safer, and that the executing capacity of the control system is higher than the executing capacity of the TPU.

Figure 5:
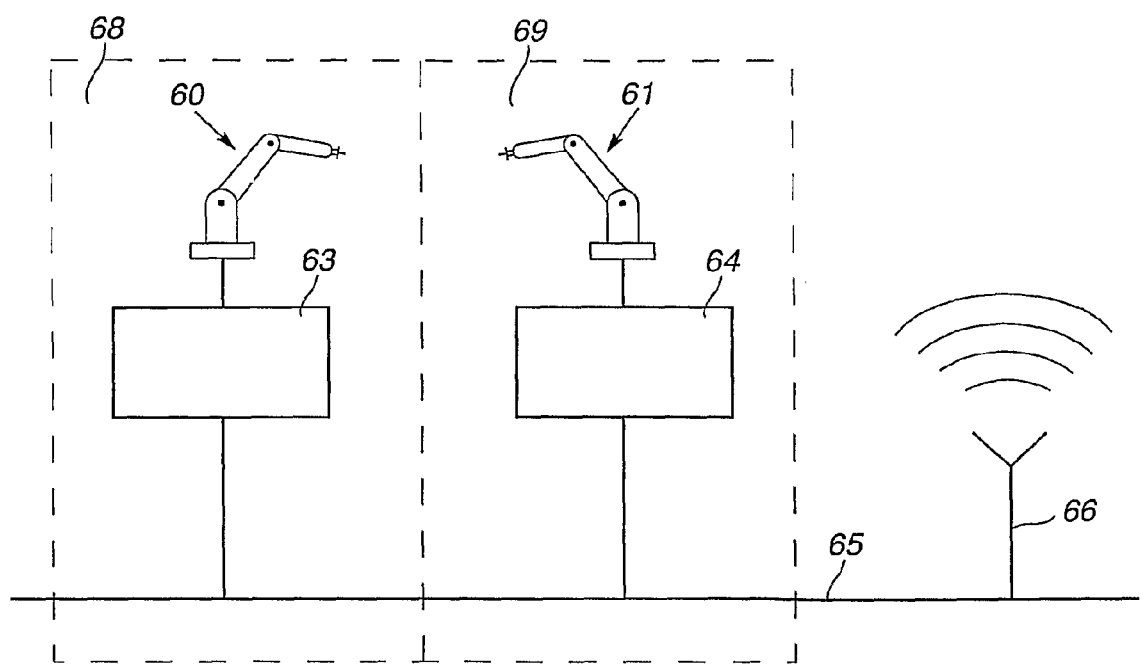
FIG. 5 shows an industrial robot system according to another embodiment of the invention.

FIG. 5 shows an embodiment of the invention comprising two industrial robots 60, 61. Each robot is connected to a control system 63, 64. The control systems are connected to a local network 65. The TPU is for example connected to the network by means of VLAN or bluetooth. The network 65 comprises one access point 66 adapted for wireless communication with the TPU. The TPU is connected to the network 65 via a wireless data link and through the access point 66. Each of the robots 60, 61 has an area 68, 69 defined in the vicinity of the robot. The detecting unit detects when the TPU enters or leaves any of the defined areas 68, 69. The login module is adapted to upon detecting that the TPU enters any of the defined areas, automatically login the TPU to the control system 63, 64 of the robot having the area entered by the TPU. The logout module automatically logs out the TPU when it leaves the area. Thus, it is easy for the operator to move between the robots and control them with the same TPU.

Figure 6:
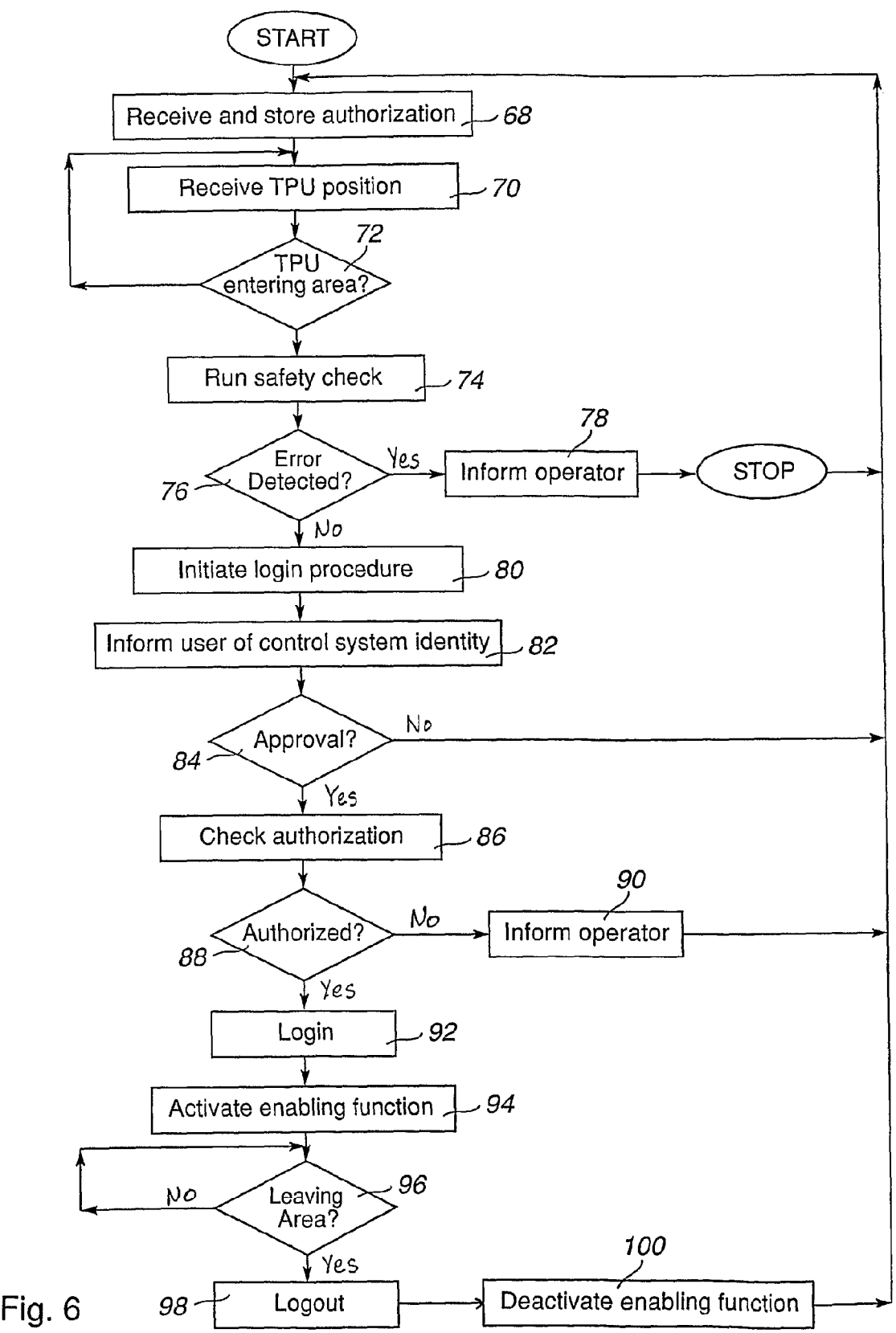
FIG. 6 illustrates by means of a flow diagram a method for controlling an industrial robot system according to an embodiment of the invention.

FIG. 6 is a flow diagram illustrating a method and a computer program for coupling a wireless TPU to a robot controller, according to an embodiment of the present invention. It will be understood that each block of the flow diagram can be implemented by computer program instructions, which are executed by the central processing unit 56. A presumption is that the TPU has already been connected to the local network and thus a communication link has been established between the TPU and the robot.

When the operator picks up the TPU and begins to use it, he enters information about his authority to the system, such as his identity and safety code. This information is received and stored by the system as the authorization of the operator, block 68. The system consecutively receives the position of the TPU, block 70. Preferably, the position of the TPU is received as position coordinates (x, y). The system determines whether the received position of the TPU are within the defined area, or if more than one area is defined within any of the defined areas, block 72. If the coordinates are within any of the defined areas, the safety check is run, block 74, otherwise the system waits for a new TPU position.

During the safety check control signals are send to the measuring equipment, which carries out measurements on the safety equipment. The safety check module receives measurements from the measuring equipment and on bases thereof determines whether there is any error in the safety equipment or not, block 76. If any error is detected, the operator is informed about the error, block 78. For example an error message is displayed on the display screen. If an error is detected the program is stopped and the login procedure cannot be initiated.

If no error is detected during the safety check the login procedure is initiated, block 80. The user is informed of the identity of the control system, which he is about to log in to, block 82. For instance the identity of the control system is displayed on the display screen. If the operator wishes to go on with the login procedure he states his approval by, for example by activating any of the function keys.

If the operator has made his approval, the authorization of the operator is checked, block 86 by means of the previously received and stored authorization information. If the operator is not authorized, block 88, the operator is informed, block 90, otherwise the TPU is logged in to the control system, block 92, and the enabling function is activated, block 94, and the operator can control the robot by means of the TPU.

As long as the operator stays within the defined area, the TPU continues to be logged in to the control system. The system continuously receives TPU positions, and checks whether the position of the TPU is still inside the area or if it has been moved outside the area. If the system notices that the TPU is leaving the area, block 96, the TPU is automatically logged out from the control system, block 98, and deactivated the enabling function, block 100. The enabling function is deactivated by deactivating the enabling circuit, and thereby disables the function of the enabling device.

When the TPU has been logged out from the control system, the steps of the method are repeated again from the beginning. New TPU positions are received and the system continues to detect if the TPU enters any of the other areas, or enters the same area again. Accordingly, the operator may easily control several robots with the same TPU and without any problems change between which one of the robots to be controlled. To login to a particular robot the operator only has to move close enough to the robot, i.e. move within the defined area, and the TPU is automatically logged in to the robot, and to logout from the robot the operator only has to move away from the robot, i.e. to move outside the defined area, and the TPU is automatically logged out from the robot.

According to an embodiment of the invention it is also possible to have more than one robot within one defined area. The operator then has to choose which of the controllers to be logged in to. Which controllers there is to choose between, are displayed on the display screen of the TPU, and the operator selects one of the controllers displayed.

In some applications the robots are located so close to each other that the working rage of neighboring robots are overlapping. In that case it is possible to define areas that overlap each other. When the operator enters such an overlapping area he must select which of the robots to couple to. According to one embodiment of the invention, the system is adapted to display the identity of the robots belonging to the areas, when the operator enters the overlapping area, and when the operator has selected one of the robots displayed, the system is adapted to couple the control system of the selected robot to the TPU.

The present invention is not limited to the embodiments disclosed but may be varied and modified within the scope of the following claims. For example, instead of running the safety check when the operator enters an area defined for a specific robot, the safety check could be run when the operator enters a larger area defined for more than one robot, for example the larger area is the whole robot cell. For instance, the safety check could be run at about the same time as the TPU is connected to the network and is establishing a communication with the control system. Not necessarily, all robots are provided with an authorization check. Accordingly, in another embodiment of the invention the system does not have any authorization check. In one embodiment of the invention only the enabling function is activated upon entry of the specific area. The safety check is then performed earlier and is either carried out manually or automatically by means of a safety check module.

In one embodiment of the invention, the industrial robot system comprises more than one manipulator and the control system includes one enabling circuit for enabling manual operation of all the manipulators. All manipulators are located within the defined area and manual operation of the manipulators by means of the TPU, are enabled upon entering the area.

The invention claimed is:

1. An industrial robot system, comprising:
    at least one industrial robot comprising at least one manipulator and a control unit for controlling the manipulator, and
    a portable operator control device for teaching and manually operating a robot, which portable operator control device comprises safety equipment including an enabling device, which upon activation enables manual operation of the robot by means of the portable operator control device, and the portable operator control device is adapted for wireless communication with the control unit, a detecting unit, detecting when the portable operator control device enters an area defined in the vicinity of the manipulator, wherein the robot comprises an enabling function which upon activation enables the enabling device of the portable operator control device, and upon deactivation disables the enabling device, and wherein the robot system is adapted to automatically activate the enabling function of the robot upon detecting that the portable operator control device enters said defined area, and a safety check module adapted to provide an automatic check of said safety equipment, including the enabling device, upon activation, wherein the safety check module is adapted to be run automatically upon detecting that the portable operator control device enters said defined area, wherein the robot system is adapted to verify whether at least one condition is fulfilled, and provided that said at least one condition is fulfilled the enabling function of the portable operator control device is automatically activated upon detecting that the portable operator control device enters said defined area, wherein one of said at least one condition is that a check of said safety equipment has been carried out and no errors were found.

2. The industrial robot system according to claim 1, wherein the control system of the robot comprises an enabling circuit and wherein the robot system is adapted to activate the enabling circuit of the robot upon detecting that the portable operator control device enters said defined area.

3. The industrial robot system according to claim 1, wherein one of said conditions is that the operator is authorized to use the robot.

4. The industrial robot system according to claim 1, further comprising:
measuring equipment carrying out measurements on the safety equipment, wherein said safety check module is adapted to receive said measurements and on bases thereof detecting errors in the safety equipment.

5. The industrial robot system according to claim 1, wherein said safety check module is adapted to provide an error message to the operator upon detecting an error in the safety equipment during the safety check.

6. The industrial robot system according to claim 1, wherein said safety equipment comprises an emergency stop button or a stop button and said safety check module is adapted to carry out a safety test on the emergency stop button or the stop button.

7. The industrial robot system according to claim 1, wherein said detecting unit comprises means for determining the position of the portable operator control device, and wherein the detecting unit is detecting when the portable operator control device enters said area based on the position of the portable operator control device.

8. The industrial robot system according to claim 1, further comprising:
a login module providing a procedure to login the portable operator control device to the control system of the robot, wherein the login module is adapted to be run automatically upon detecting that the portable operator control device has entered said defined area.

9. The industrial robot system according to claim 8, wherein said login module comprises means for providing a message informing the user of which control system he is about to be logged in to.

10. The industrial robot system according to claim 9, wherein said login module is adapted for receiving an approval or a non-approval from the user in response to said message, and wherein said login module is adapted to continue the login procedure upon receiving an approval from the user and to interrupt the login procedure upon receiving a non-approval from the user.

11. The industrial robot system according to claim 1, further comprising:
storage means adapted for storing information of the authorization of the present user, wherein said login module comprises means for checking whether the user is authorized to login to the control system, based on the stored information about the authorization of the user.

12. The industrial robot system according to claim 1, wherein said detecting unit is adapted to detect when the portable operator control device leaves said defined area, and that the system is adapted to upon detecting that the portable operator control device leaves said defined areas, automatically deactivate the enabling function of the robot.

13. The industrial robot system according to claim 1, further comprising:
a logout module providing a procedure to logout the portable operator control device from the control system, wherein said detecting unit is adapted to detecting when the portable operator control device leaves the defined area, and the logout module is adapted to be run automatically upon detecting that the portable operator control device leaves said defined area.

14. The industrial robot system according to claim 1, wherein the industrial robot system comprises more than one industrial robot, each robot having an area defined in the vicinity of the manipulator of the robot, wherein said detecting unit is adapted to detect when the portable operator control device enters or leaves any of said defined areas, and wherein the system is adapted to upon detecting that the portable operator control device enters one of said defined areas, automatically activate the enabling function of the robot having the area entered by the portable operator control device, and upon detecting that the portable operator control device leaves one of said defined areas, automatically deactivate the enabling function of the robot having the area left by the portable operator control device.

15. The industrial robot system according to claim 14, wherein said login module is adapted to upon detecting that the portable operator control device enters one of said defined areas, automatically login the portable operator control device to the control system of the robot having the area entered by the portable operator control device, and wherein upon detecting that the portable operator control device leaves one of said defined areas, automatically logout the portable operator control device from the control system of the robot having the area leaved by the portable operator control device.

16. The industrial robot system according to claim 1, wherein said area includes the working range of the robot.

17. The method for coupling a portable operator control device to an industrial robot comprising at least one manipulator and a control unit for controlling the manipulator, wherein the portable operator control device is adapted for teaching and manually operating the robot, and comprises safety equipment including an enabling device, which upon activation enables manual operation the robot utilizing the portable operator control device, and comprises a safety check module adapted to provide an automatic check of said safety equipment, including the enabling device, and the robot comprises an enabling function which upon activation enables the enabling device of the portable operator control device, and upon deactivation disables the enabling device of the portable operator control device, the method comprising:
- establishing communication between the portable operator control device and the control unit of the robot,
- detecting when the portable operator control device enters an area defined in the vicinity of the manipulator,
- automatically checking said safety equipment including the enabling device with the safety check module upon activation, wherein the safety check module is adapted to be run automatically upon detecting that the portable operator control device enters said defined area,
- upon detecting that the portable operator control device enters said defined area automatically activating the enabling function of the robot,
- verifying with the robot system whether at least one condition is fulfilled, and
- provided that said at least one condition is fulfilled automatically activating the enabling function of the portable operator control device upon detecting that the portable operator control device enters said defined area, wherein one of said at least one condition is that a check of said safety equipment has been carried out and no errors were found.

18. The method according to claim 17, wherein the enabling function comprises an enabling circuit and the enabling function is activate by activating the enabling circuit.

19. The method according to claim 17, wherein one of said conditions is that the operator is authorized to use the robot.

20. The method according to claim 17, wherein the running of the check module comprises receiving measurements made on the safety equipment, and on bases thereof detecting errors in the safety equipment.

21. The method according to claim 17, wherein the running of the check module comprises providing an error message to the operator upon detecting an error in the safety equipment during the safety check.

22. The method according to claim 17, wherein said automatically detecting step comprises receiving measurements of the position of the portable operator control device, and on bases thereof determining when the portable operator control device enters and leaves said defined area.

23. The method according to claim 17, further comprising:
- upon detecting that the portable operator control device enters said defined area automatically running a login procedure, logging the portable operator control device in to the control system of the robot.

24. The method according to claim 23, wherein said login procedure comprises: providing a message informing the user of which control system he is about to be logged in to.

25. The method according to claim 24, wherein said login procedure comprises: receiving an approval or a non-approval from the user in response to said message, and continuing the login procedure upon receiving an approval from the user, or interrupting the login procedure upon receiving a non-approval from the user.

26. The method according to claim 23, further comprising:
- receiving and storing information of the authorization of the present user, wherein said login procedure comprises: checking whether the user is authorized to login to the control system, based on the stored information about the authorization of the user.

27. The method according to claim 17, further comprising:
- automatically detecting when the portable operator control device leaves said defined area/areas, and
- automatically logging out the portable operator control device from the control system upon detecting that the portable operator control device leaves said defined area.

28. The method according to claim 17, further comprising:
- detecting when the portable operator control device leaves said defined area, and
- upon detecting that the portable operator control device leaves said defined areas, automatically deactivate the enabling function of the robot.

29. The method according to claim 17, wherein the industrial robot system comprises more than one industrial robot, each robot having an area defined in the vicinity of the robot, the method further comprising:
- detecting when the portable operator control device enters or leaves any of said defined areas,
- upon detecting that the portable operator control device enters one of said defined areas automatically activating the enabling function of the robot having the area entered by the portable operator control device, and
- upon detecting that the portable operator control device leaves one of said defined areas, automatically deactivate the enabling function of the robot having the area leaved by the portable operator control device.

30. The method according to claim 29, further comprising:
- upon detecting that the portable operator control device enters one of said defined areas automatically login the portable operator control device to the control system of the robot having the area entered by the portable operator control device, and
- upon detecting that the portable operator control device leaves one of said defined areas, automatically logout the portable operator control device from the control system of the robot having the area leaved by the portable operator control device.

31. A computer program product, comprising:
a computer readable medium; and
computer program instructions recorded on the computer readable medium and executable by a processor for carry out a method for coupling a portable operator control device to an industrial robot, the method comprising establishing communication between the portable operator control device and a control unit of the robot, detecting when the portable operator control device enters an area defined in the vicinity of a manipulator of the robot, automatically checking said safety equipment including the enabling device with the safety check module upon activation, wherein the safety check module is adapted to be run automatically upon detecting that the portable operator control device enters said defined area, upon detecting that the portable operator control device enters said defined area automatically activating an enabling function of the robot, verifying with the robot system whether at least one condition is fulfilled, and provided that said at least one condition is fulfilled automatically activating the enabling function of the portable operator control device upon detecting that the portable operator control device enters said defined area, wherein one of said at least one condition is that a check of said safety equipment has been carried out and no errors were found.

* * * * *